(12) United States Patent
Yun et al.

(10) Patent No.: US 10,283,793 B2
(45) Date of Patent: May 7, 2019

(54) COMBINED GENERATION SYSTEM AND METHOD FOR COLLECTING CARBON DIOXIDE FOR COMBINED GENERATION SYSTEM

(71) Applicant: DOOSAN HEAVY INDUSTRIES & CONSTRUCTION CO., LTD., Changwon-si, Gyeongsangnam-do (KR)

(72) Inventors: Choamun Yun, Daejeon (KR); Taehee Kim, Daejeon (KR); Gipung Lee, Daejeon (KR); Taewon Lee, Daejeon (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 756 days.

(21) Appl. No.: 14/369,866

(22) PCT Filed: Dec. 28, 2012

(86) PCT No.: PCT/KR2012/011770
§ 371 (c)(1),
(2) Date: Jun. 30, 2014

(87) PCT Pub. No.: WO2013/100711
PCT Pub. Date: Jul. 4, 2013

(65) Prior Publication Data
US 2014/0356740 A1    Dec. 4, 2014

(30) Foreign Application Priority Data

Dec. 30, 2011  (KR) .................. 10-2011-0147824
Dec. 27, 2012  (KR) .................. 10-2012-0155169
(Continued)

(51) Int. Cl.
*H01M 8/0612*    (2016.01)
*C10J 3/00*    (2006.01)
(Continued)

(52) U.S. Cl.
CPC ............. *H01M 8/0618* (2013.01); *C01B 3/12* (2013.01); *C10J 3/00* (2013.01); *C10K 1/005* (2013.01);
(Continued)

(58) Field of Classification Search
CPC .... H01M 8/06; H01M 8/0606; H01M 8/0612; H01M 8/0618; H01M 8/0643;
(Continued)

(56) References Cited

U.S. PATENT DOCUMENTS 3,993,457 A * 11/1976 Cahn .................. C07C 29/1518
48/197 R
5,084,362 A    1/1992 Farooque
(Continued)

FOREIGN PATENT DOCUMENTS

EP    1 136 542 A1    9/2001
EP    1 207 132 A1    5/2002
(Continued)

OTHER PUBLICATIONS

International Search Report of PCT/KR2012/011770 dated Apr. 19, 2013.
(Continued)

*Primary Examiner* — Eli S Mekhlin
(74) *Attorney, Agent, or Firm* — Invenstone Patent, LLC (57) ABSTRACT

A combined generation system according to one embodiment of the present invention comprises: a natural gas synthesizing apparatus for receiving coal and oxygen, generating synthetic gas by a gasifier, and permitting the synthetic gas to pass through a methanation reactor so as to
(Continued)

synthesize methane; a fuel cell apparatus for receiving fuel that contains methane from the natural gas synthesizing apparatus and generating electrical energy; and a generating apparatus for producing electrical energy using the fluid discharged from the fuel cell apparatus.

10 Claims, 9 Drawing Sheets

(30) Foreign Application Priority Data

Dec. 27, 2012 (KR) .................. 10-2012-0155171
Dec. 28, 2012 (KR) .................. 10-2012-0156126

(51) Int. Cl.
| | |
|---|---|
| *C10K 1/00* | (2006.01) |
| *C10K 3/04* | (2006.01) |
| *C10L 3/08* | (2006.01) |
| *H01M 8/0662* | (2016.01) |
| *H01M 8/0668* | (2016.01) |
| *C01B 3/12* | (2006.01) |
| *C10L 3/10* | (2006.01) |
| *H01M 8/14* | (2006.01) |

(52) U.S. Cl.
CPC ............. *C10K 3/04* (2013.01); *C10L 3/08* (2013.01); *C10L 3/102* (2013.01); *H01M 8/0643* (2013.01); *H01M 8/0662* (2013.01); *H01M 8/0668* (2013.01); *C01B 2203/025* (2013.01); *C01B 2203/0283* (2013.01); *C01B 2203/062* (2013.01); *C01B 2203/142* (2013.01); *C10J 2300/093* (2013.01); *C10J 2300/0959* (2013.01); *C10J 2300/0976* (2013.01); *C10J 2300/1646* (2013.01); *C10J 2300/1662* (2013.01); *C10J 2300/1678* (2013.01); *C10J 2300/1838* (2013.01); *C10L 2290/02* (2013.01); *C10L 2290/562* (2013.01); *H01M 2008/147* (2013.01); *Y02E 60/526* (2013.01); *Y02P 20/13* (2015.11)

(58) Field of Classification Search
CPC ............. H01M 8/0662; H01M 8/0668; H01M 8/0675; H01M 8/0637
See application file for complete search history.

(56) References Cited

U.S. PATENT DOCUMENTS

| | | | | |
|---|---|---|---|---|
| 5,169,717 | A | 12/1992 | Topsoe | |
| 5,213,912 | A * | 5/1993 | Kunz | H01M 8/0662 |
| | | | | 429/410 |
| 6,162,556 | A * | 12/2000 | Vollmar | H01M 8/0612 |
| | | | | 429/411 |
| 2005/0175869 | A1* | 8/2005 | Blanchet | H01M 8/0625 |
| | | | | 429/423 |
| 2008/0187789 | A1* | 8/2008 | Ghezel-Ayagh | F02C 1/007 |
| | | | | 429/414 |
| 2008/0263953 | A1* | 10/2008 | Okada | B01J 8/0492 |
| | | | | 48/127.9 |
| 2010/0074839 | A1 | 3/2010 | Drnevich et al. | |
| 2010/0129691 | A1* | 5/2010 | Dooher | C01B 3/34 |
| | | | | 429/425 |
| 2011/0111314 | A1* | 5/2011 | Cui | C01B 3/38 |
| | | | | 429/417 |

FOREIGN PATENT DOCUMENTS

| | | | | |
|---|---|---|---|---|
| EP | | 1207132 A1 * | 5/2002 | .......... B01D 53/14 |
| EP | | 2 112 709 A1 | 10/2009 | |
| EP | | 2112709 A1 * | 10/2009 | ........ H01M 8/04022 |
| KR | 10-2002-0020931 A | | 3/2002 | |
| KR | 10-2012-0014840 A | | 2/2012 | |

OTHER PUBLICATIONS

Communication dated Mar. 3, 2016 from the European Patent Office in counterpart Application No. 12862632.2.
Communication dated Jun. 7, 2017, from the European Patent Office in counterpart European Application No. 12862632.2.

\* cited by examiner

COMBINED GENERATION SYSTEM AND METHOD FOR COLLECTING CARBON DIOXIDE FOR COMBINED GENERATION SYSTEM

CROSS REFERENCE TO RELATED APPLICATIONS

This is a National Stage of International Application No. PCT/KR2012/011770 filed Dec. 28, 2012, claiming priority based on Korean Patent Application No. 10-2011-0147824 filed Dec. 30, 2011, Korean Patent Application No. 10-2012-0155169 filed Dec. 27, 2012, Korean Patent Application No. 10-2012-0155171 filed Dec. 27, 2012, and Korean Patent Application No. 10-2012-0156126 filed Dec. 28, 2012, the contents of all of which are incorporated herein by reference in their entirety.

TECHNICAL FIELD

Embodiments of the present invention relate to a combined power generation system complexly equipped with a natural gas synthesis apparatus and a fuel cell apparatus.

BACKGROUND ART

A natural gas synthesis apparatus is an apparatus for producing a Synthetic Natural Gas (hereinafter called SNG). The natural gas synthesis apparatus is configured to implement a process of gasifying coal and organic raw materials at high pressure and high temperature, performing a gas refining process, and producing gas having methane as a main component by synthesizing CO and $H_2$ included in a synthetic gas in a ratio of 1:3. The synthesized SNG is alternative energy, and may be synthesized from several organic raw materials. The SNG is advantageous in that an existing LNG supply network can be used without change, and may be used as the raw materials of synthetic petroleum and synthetic compounds.

Furthermore, a fuel cell apparatus has been in the spotlight as a high efficiency and clean energy power production system. The fuel cell apparatus is a power generation apparatus for directly converting chemical energy into electrical energy. In the fuel cell apparatus, fuel including hydrogen continues to be supplied and air including oxygen continues to be supplied, and the supplied hydrogen and oxygen experience an electrochemical reaction, thereby directly converting an energy difference anterior and posterior to the reaction into electrical energy. A fuel cell may continue to generate electrical energy as fuel and oxygen continue to be supplied as described above.

A coal thermoelectric power plant for producing electrical energy using coal as a main raw material discharges a large amount of carbon dioxide. Carbon dioxide is the subject of the reduction of a greenhouse gas, and thus to reduce the amount of carbon dioxide emitted from the coal thermoelectric power plant is an important problem of the coal thermoelectric power plant.

Accordingly, a scheme for collecting carbon dioxide and supplying the collected carbon dioxide to a fuel cell apparatus while implementing a more efficient power generation system by combining a natural gas synthesis apparatus and the fuel cell apparatus may be taken into consideration.

DISCLOSURE

Technical Problem

An object of the present invention is to provide a more efficient combined power generation system.

Another object of the present invention is to provide a combined power generation system having higher efficiency and a higher carbon dioxide collection ratio by associating a natural gas synthesis apparatus with a fuel cell apparatus or associating a natural gas synthesis apparatus and a fuel cell apparatus with a carbon dioxide discharge facility, such as a coal thermoelectric power plant.

Technical Solution

In order to achieve the objects of the present invention, a combined power generation system in accordance with an embodiment of the present invention includes a natural gas synthesis apparatus for being supplied with coal and oxygen, generating a synthetic gas through a gasifier, and synthesizing methane through a methanation reactor, a fuel cell apparatus for being supplied with fuel including the methane from the natural gas synthesis apparatus and generating electrical energy, and a power generation apparatus for producing electrical energy using a fluid discharged by the fuel cell apparatus.

In accordance with an embodiment related to the present invention, the natural gas synthesis apparatus may further include a first reactor for generating hydrogen and carbon dioxide through a water gas shift reaction using a fluid introduced by the gasifier and a second reactor for being supplied with a fluid discharged by the first reactor and separating the carbon dioxide and sulfur compounds through physical or chemical segregation.

In accordance with an embodiment related to the present invention, the fuel cell apparatus may further include a cathode electrode and an anode electrode, and the fuel supplied by the natural gas synthesis apparatus may be supplied to the anode electrode.

In accordance with an embodiment related to the present invention, unused fuel discharged by the anode electrode may be introduced into the first reactor.

In accordance with an embodiment related to the present invention, the carbon dioxide generated through the first reactor and the second reactor may be converted into the methane in the methanation reactor and introduced into the anode electrode.

In accordance with an embodiment related to the present invention, the carbon dioxide discharged by the second reactor may be supplied to the cathode electrode.

In accordance with an embodiment related to the present invention, an oxygen supply unit for supplying oxygen to the gasifier is further includes, wherein the oxygen supply unit may supply at least some oxygen to the cathode electrode.

In accordance with an embodiment related to the present invention, a condenser connected to the cathode electrode so that water and carbon dioxide are separated from the fluid discharged by the cathode electrode may be further included.

In accordance with an embodiment related to the present invention, the power generation apparatus may include a compressor for compressing fluid discharged by a stack unit, an oxidizer for oxidizing the fluid passing through the compressor, and a turbine for generating power using gas discharged by the oxidizer.

In accordance with an embodiment related to the present invention, a heat recovery steam generator connected to the turbine so that exhaust heat of the gas discharged by the turbine is absorbed may be further included.

Furthermore, in order to achieve the above objects, another embodiment of the present invention discloses a combined power generation system, including a natural gas synthesis apparatus for being supplied with coal and oxygen, generating a synthetic gas through a gasifier, and synthesizing methane through a methanation reactor, a fuel cell apparatus for being supplied with fuel including the methane from the natural gas synthesis apparatus and generating electrical energy, and a carbon dioxide supply unit for supplying the cathode electrode of the fuel cell apparatus with carbon dioxide discharged by a carbon dioxide discharge facility adjacent to the fuel cell apparatus.

In accordance with an embodiment related to the present invention, the fuel cell apparatus may include an anode electrode for being supplied with hydrogen formed from the methane generated by the methanation reactor.

In accordance with an embodiment related to the present invention, a first reactor for generating hydrogen and carbon dioxide through a water gas shift reaction using a fluid introduced from the gasifier is further included, wherein unused fuel discharged by the anode electrode is introduced into the first reactor.

In accordance with an embodiment related to the present invention, a second reactor for being supplied with a fluid discharged by the first reactor and separating the carbon dioxide and sulfur compounds through physical or chemical segregation may be further included.

In accordance with an embodiment related to the present invention, the carbon dioxide supply unit may further include a desulfurization apparatus for removing sulfur from an exhaust gas discharged by a power plant and a pressurization apparatus for pressurizing an exhaust gas, including carbon dioxide, at a specific pressure or higher and supplying the pressurized gas to the cathode electrode.

Furthermore, in order to achieve the above objects, another embodiment of the present invention discloses a combined power generation system, including a natural gas synthesis apparatus including a gasifier for being supplied with coal and oxygen and generating a synthetic gas, a first reactor for generating hydrogen using the generated synthetic gas, and a methanation reactor for synthesizing methane using the generated hydrogen, a fuel cell apparatus for being supplied with fuel including the methane from the natural gas synthesis apparatus and generating electrical energy, and a separation membrane apparatus for separating hydrogen from a mixture gas discharged by the fuel cell apparatus and supplying the separated hydrogen to the first reactor.

In accordance with an embodiment related to the present invention, at least some of carbon dioxide included in the mixture gas may be separated and supplied to the gasifier.

In accordance with an embodiment related to the present invention, a carbon dioxide supply unit for supplying the cathode electrode of the fuel cell apparatus with carbon dioxide discharged by a carbon dioxide discharge facility adjacent to the fuel cell apparatus may be further included.

In accordance with an embodiment related to the present invention, the fuel cell apparatus may include an anode electrode and a cathode electrode, and the carbon dioxide supply unit may supply the cathode electrode with carbon dioxide.

In accordance with an embodiment related to the present invention, the carbon dioxide supply unit may further include a desulfurization apparatus for removing sulfur from an exhaust gas discharged by the power plant and a pressurization apparatus for pressurizing carbon dioxide at a specific pressure or higher and supplying the pressurized carbon dioxide to the cathode electrode.

In accordance with an embodiment related to the present invention, a second reactor for being supplied with a fluid discharged by the first reactor and separating carbon dioxide and sulfur compounds through physical or chemical segregation may be further included.

Advantageous Effects

The combined power generation system related to at least one embodiment of the present invention configured as above can reduce the cost of equipment and operating expenses and can collect $CO_2$ by complexly configuring a natural gas synthesis apparatus and a fuel cell apparatus.

In accordance with another embodiment, the volume of a carbon dioxide recovery apparatus, an installation cost, and operating expenses can be reduced because the fuel cell apparatus is used to recover carbon dioxide discharged in coal thermal power generation.

Furthermore, the volume of a carbon dioxide recovery apparatus and consumption power can be reduced because the fuel cell apparatus is used to recover carbon dioxide discharged from a coal thermal power generation.

Furthermore, since carbon dioxide is separated from the mixture gas discharged by the anode electrode through the separation membrane apparatus, the capacity of the second reactor can be reduced, additional fuel through the reuse of carbon dioxide can be generated because a Boudouard reaction is induced, and power consumption of the entire system can be reduced by reducing the amount of air supplied to the gasifier. Accordingly, energy efficiency of the entire combined power generation system and a carbon dioxide collection ratio can be improved.

MODE FOR INVENTION

Hereinafter, a combined power generation system and a method of collecting carbon dioxide in the combined power generation system related to the present invention are described in detail with reference to the accompanying drawings. The suffixes of elements used in the following description, such as "module" and "unit," are assigned or interchangeable with each other by taking only the easiness of writing this specification into consideration, but in themselves are not particularly given importance and roles. In this specification, the same or similar elements are assigned the same or similar reference numerals although they are included in different embodiments, and descriptions thereof are replaced with the first descriptions. An expression of the singular number used in this specification includes an expression of the plural number unless clearly defined otherwise in the context.

Figure 1:
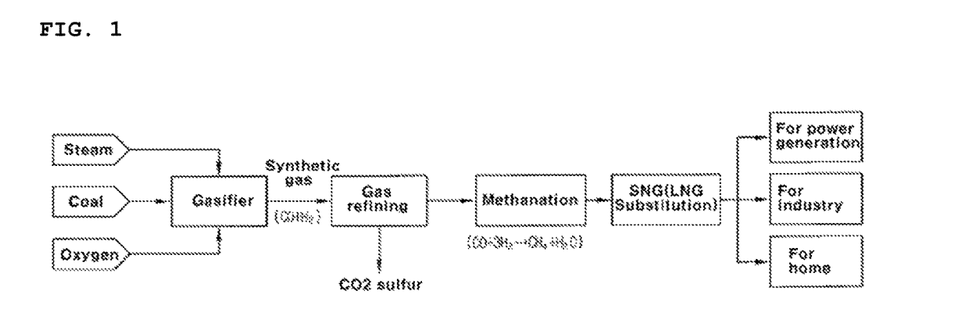
FIGS. 1 and 2 are conceptual diagrams of the reaction process and apparatus of a natural gas synthesis apparatus related to an embodiment of the present invention.
Figure 2:
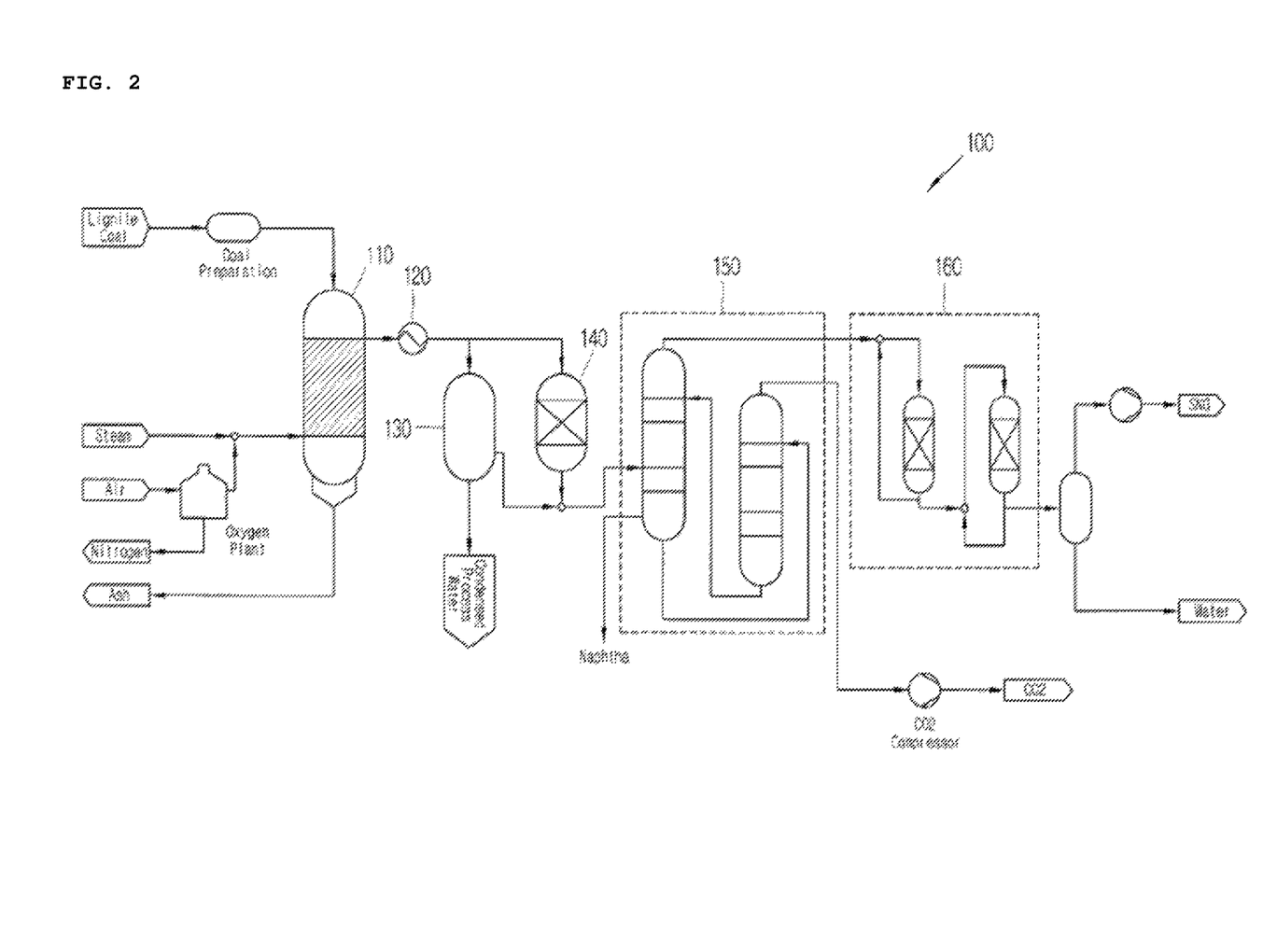

FIGS. 1 and 2 are conceptual diagrams of the reaction process and apparatus of a natural gas synthesis apparatus related to an embodiment of the present invention.

As illustrated in FIG. 1, the natural gas synthesis apparatus 100 is a clean coal fuel technology for producing SNG, synthetic petroleum, or power by gasifying (CO+H$_2$) cheap coal at a high temperature and at high pressure and refining the gasified results.

As illustrated in FIG. 2, pre-processed raw materials meet oxygen in a gasifier 110, thereby producing hydrogen (H$_2$) and carbon monoxide (CO), that is, a synthetic gas, about 1400° C., and generating carbon dioxide (CO$_2$), methane (CH$_4$), hydrogen sulfide (H$_2$S), and ash, that is, by products.

The gas having such a high temperature is thermally recovered through a synthetic gas cooling unit 120, and then experiences a gas refining process for removing polluting gases, such as dust, sulfur, and mercury through a gas refining unit 130. After the polluting gas refining process is performed, a synthetic gas including hydrogen, carbon monoxide, carbon dioxide, methane, and hydrogen sulfide as main components is generated. The synthetic gas having such a composition is introduced into a first reactor 140 configured to perform a water gas shift reaction.

Furthermore, the synthetic gas introduced into the first reactor 140 generates H$_2$ and CO$_2$ through a water gas shift reaction (CO+H$_2$O→CO$_2$+H$_2$), and is then introduced into a Rectisol reactor (hereinafter referred to as a second reactor). The second reactor 150 separates CO$_2$ and sulfur components through physical or chemical segregation. In this case, the separated CO$_2$ may be compressed and buried in the underground.

That is, the natural gas synthesis apparatus 100 includes the first reactor 140 for generating H$_2$ and CO$_2$ through the water gas shift reaction using an introduced fluid and the second reactor 150 for separating CO$_2$ and sulfur components through physical or chemical segregation.

The second reactor 150 is connected to a methanation reactor 160. The methanation reactor 160 generates methane using carbon monoxide and hydrogen introduced by the second reactor 150, and may compress the methane and supply the compressed methane to a fuel cell apparatus 200. Furthermore, although not illustrated, the natural gas synthesis apparatus 100 and a power generation unit may be associated so that methane generated by the natural gas synthesis apparatus 100 may be used.

The methanation process occurring in the methanation reactor 160 is a process of regenerating the synthetic gas into methane through a reaction of hydrogen, carbon dioxide, and carbon monoxide included in the synthetic gas, and experiences the following (i) and/or (ii) reactions.

$$CO+3H_2 \rightarrow CH_4+H_2O \quad (i)$$

$$CO_2+4H_2 \rightarrow CH_4+2H_2O \quad (ii)$$

The methanation reaction may be performed under any condition for which an object for supplying a fuel electrode gas, including methane, to coal gasification combined power generation-associated fuel cell system of the present invention may be achieved, but may be performed in any of reaction temperature ranges of 100 to 400° C., 200 to 350° C., and 250 to 300° C. because the methanation reaction is an exothermic reaction and thus carbon monoxide has a low equilibrium concentration and reaction speed also becomes slow if a reaction temperature is low.

The methanation reaction may be performed using one or more types of methanation catalysts selected from the group consisting of a nickel-based methanation catalyst, an iron-based methanation catalyst, and a ruthenium-based methanation catalyst.

As described above, the natural gas synthesis apparatus 100 produces methane, oxygen, and a recyclable heat source using cheap coal. If the natural gas synthesis apparatus 100 is integrated with a fuel cell module, a combined power generation plant having more excellent efficiency can be fabricated.

Figure 3:
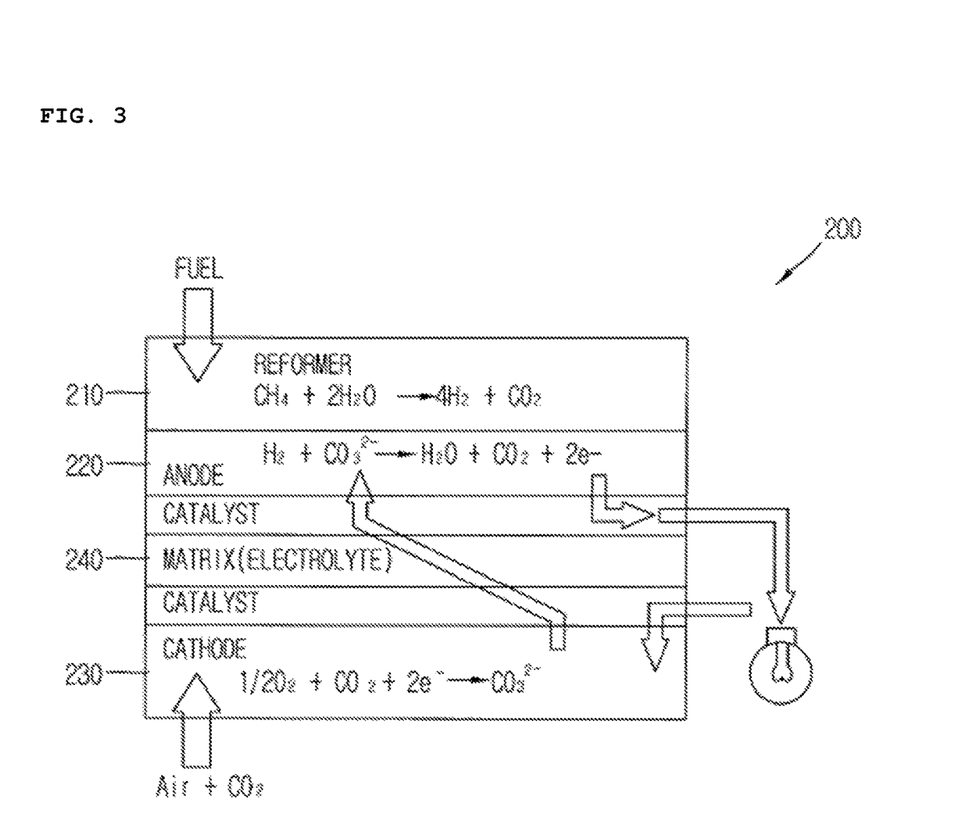
FIG. 3 is a conceptual diagram of a fuel cell apparatus related to the present invention.

FIG. 3 is a conceptual diagram of the fuel cell apparatus related to the present invention.

Kinds of fuel cells are various, for example, a phosphoric acid fuel cell, an alkaline fuel cell, a proton exchange membrane fuel cell, a molten carbonate fuel cell, a solid oxide fuel cell, and a direct methanol fuel cell. The kinds of fuel cells, such as those described above, operate according to the same principle in terms of fuel, but are classified depending on the type of fuel, operating temperature, and catalysts.

From among them, in particular, the Molten Carbonate Fuel Cell (MCFC) has a fast electrochemical reaction speed because it operates at a high temperature of 650° C. or more. Accordingly, the MCFC is advantageous in economy because nickel instead of a platinum catalyst may be used as electrode materials, and carbon monoxide that acts on the platinum electrode of a low-temperature type fuel cell as a poisoning substance may also be used as fuel through a water gas shift reaction.

Furthermore, if a nickel electrode is used, there is an advantage in that a variety of kinds of fuel, such as a coal gas, a natural gas, methanol, and bio mass, can be used.

Furthermore, in the case where a buttoming cycle using a heat recovery steam generator is applied, if waste heat having high quality and a high temperature is recovered and used, heat efficiency of the entire power generation system can be increased 60% or more.

Furthermore, since the MCFC operates at a high temperature, there is an advantage in that an internal reforming type in which a fuel reforming reaction is simultaneously performed within a fuel cell stack in which an electrochemical reaction is generated can be adopted.

Such an internal reforming MCFC is advantageous in that heat efficiency of the entire system is further improved and a system configuration is simplified because heat generated in an electrochemical reaction is directly used in a reforming reaction, that is, a heat absorption reaction, without a separate and external heat exchanger and thus the flow of heat can be effectively controlled compared to an external reforming type MCFC.

The fuel cell apparatus 200 may include a fuel supply unit for supplying a specific amount of fuel, a reformer unit 210 for being supplied with the fuel of the fuel supply unit and generating by-products including a hydrogen gas and heat, and a stack unit for generating electricity and heat through an electrochemical reaction of hydrogen gas generated by the reformer unit 210 and separately supplied oxygen.

The reformer unit 210 may include a reaction furnace and a burner. The stack unit may include a plurality of stacked unit cells, each an anode electrode 220, an electrolyte membrane 240, and a cathode electrode 230.

The operation of the fuel cell module described above is as follows.

First, when fuel, including a Liquefied Natural Gas (also known as LNG) or methane (CH$_4$) components, and water are supplied from the fuel supply unit to the reformer unit 210, a steam reforming reaction and a partial oxidation reaction are complexly generated in the reformer unit 210, thereby generating hydrogen gas, reaction heat, and other by-products including water.

$$CH_4+2H_2O \rightarrow 4H_2+CO_2$$

Furthermore, the stack unit generates electricity, heat, and water because the hydrogen gas supplied by the reformer unit 210 and separately supplied oxygen are subject to an electrochemical reaction.

The electrochemical reaction generated in each of the unit cells that form the stack unit is described in more detail below. First, hydrogen gas ($H_2$) is supplied to the anode electrode (also known as fuel electrode) 220, thus generating an electrochemical oxidation reaction with carbonate ions ($CO_3^{2-}$) and thereby generating water, carbon dioxide, and electrons e−.

$$H_2 + CO_3^{2-} \rightarrow H_2O + CO_2 + 2e^-$$

Furthermore, in the cathode electrode (also known as cathode) 230, externally supplied oxygen, carbon dioxide, and electrons generate an electrochemical reduction reaction and thus generating carbonate ions ($CO_3^{2-}$), reaction heat, and water. The carbonate ions generated by the cathode electrode 230 moves from the cathode electrode 230 to the anode electrode 220 through the electrolyte of the electrolyte membrane 240 placed between the cathode electrode 230 and the anode electrode 220. Electrons generated by the anode electrode 220 are moved via an external circuit, thereby generating electrical energy due to the migration of the electrons. In this case, the electrolyte is present in the solid state at normal times, but temperature thereof rises to about 650° C. when the fuel cell system normally operate, so the electrolyte is liquefied.

$$(\tfrac{1}{2})O_2 + CO_2 + 2e^- \rightarrow CO_3^{2-}$$

In this case, $CO_2$ is moved from the cathode electrode 230 to the anode electrode 220 through the electrolyte in accordance with an electrochemical reaction mechanism, and is then condensed. If an exhaust gas including carbon dioxide having a low concentration is supplied from a thermoelectric power plant 310 to the cathode electrode 230 of the fuel cell apparatus 200, carbon dioxide included in the exhaust gas of the thermoelectric power plant 310 is selectively carbonated according to the above reaction equation and is moved to the anode electrode 220, so the carbon dioxide can be condensed. The degree of such concentration may be a maximum of 90% of the amount of the carbon dioxide discharged by the thermoelectric power plant 310.

Furthermore, the fuel cell apparatus 200 (i.e., the MCFC) according to the present invention may be divided into an internal reforming type and an external reforming type depending on a natural gas reforming method. In particular, if a fuel shift method according to the internal reforming type is used, a catalyst may be installed on the inside of the cell and reformed, and thus natural gas can be directly used as fuel without installing a separate reformer on the outside. Furthermore, heat generated by the stack unit during power generation is used in a reforming reaction. Accordingly, a system can be simplified without a need to install a separate apparatus for stack cooling.

First Embodiment

Figure 4:
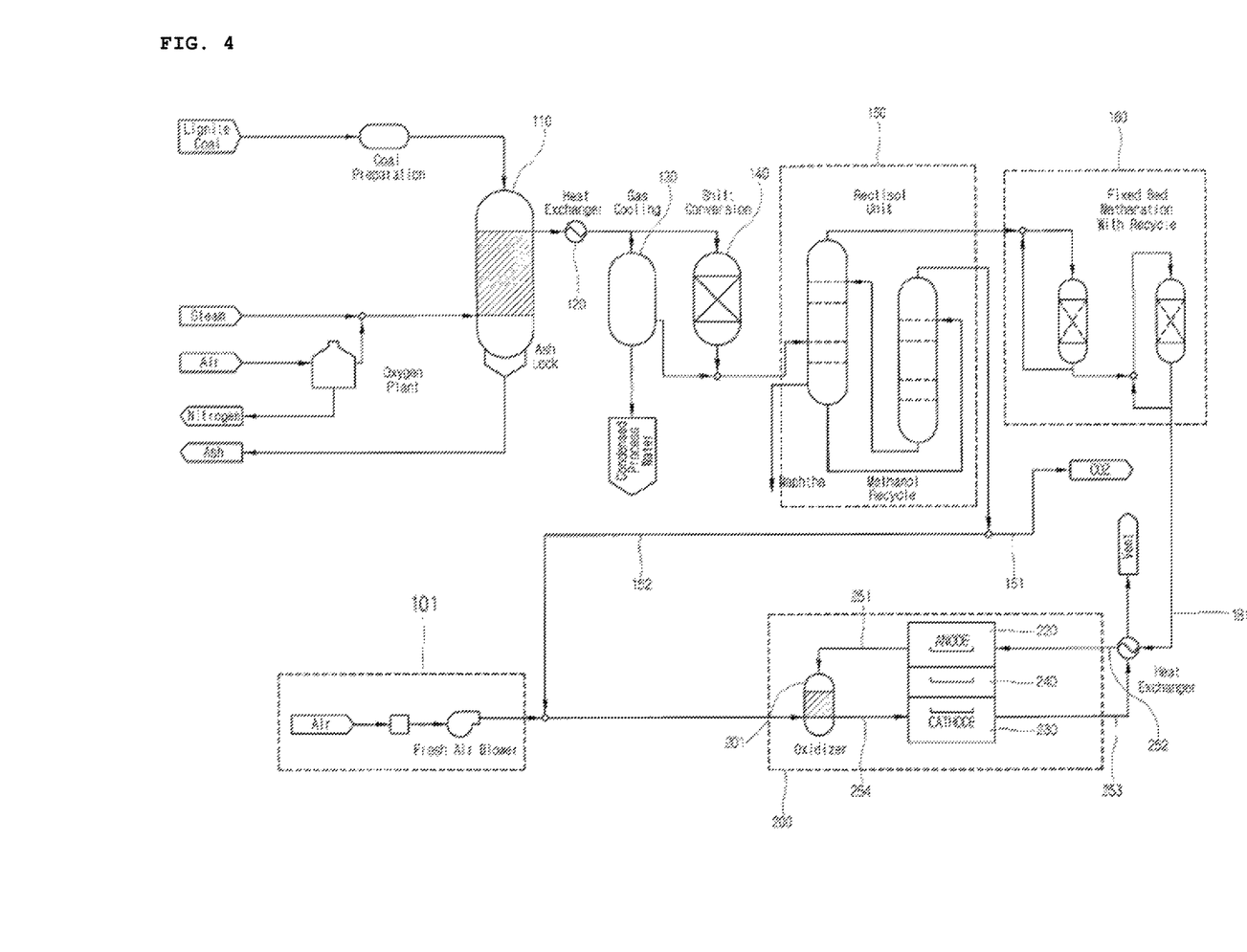
FIGS. 4 to 8 are conceptual diagrams of a combined power generation system in accordance with embodiments of the present invention.

FIG. 4 is a conceptual diagram of a combined power generation system in accordance with the first embodiment of the present invention.

Referring to FIG. 4, the fuel cell apparatus 200 is connected (a supply line 181→a supply line 252) to the natural gas synthesis apparatus 100 so that it is supplied with hydrogen from the natural gas synthesis apparatus 100. More specifically, methane generated by the methanation reactor 160 is supplied to the reformer unit 210, the reformer unit 210 forms hydrogen and carbon dioxide through a chemical reaction, and hydrogen generated by the reformer unit 210 is supplied to the anode electrode 220 of the fuel cell apparatus 200.

As described above, hydrogen ($H_2$) is supplied to the anode electrode 220, and an electrochemical oxidation reaction of hydrogen ($H_2$) and carbonate ions ($CO_3^{2-}$) is generated, thereby generating water, carbon dioxide, and electrons e−.

In this case, some of the mixture gas may be supplied to an oxidizer 201 through the discharge line 251 of the anode electrode 220.

Furthermore, carbon dioxide discharged by the second reactor 150 is discharged through supply lines 151, 152. Any one supply line 152 of the supply lines 151, 152, together with an air supply unit 101, may be configured to supply oxygen and the carbon dioxide to the oxidizer 201.

The oxygen and carbon dioxide supplied from the oxidizer 201 to the supply line 254 are supplied to the cathode electrode 230 of the fuel cell apparatus. Furthermore, the oxygen, the carbon dioxide, and the electrons supplied to the cathode electrode 230 generate an electrochemical reduction reaction, thereby generating carbonate ions ($CO_3^{2-}$), reaction heat, and water. The discharge line 253 of the cathode electrode 230 passes through the heat exchanger, and fuel supplied to the anode electrode 220 may be heated through the heat exchanger.

As described above, the combined power generation system in accordance with the first embodiment of the present invention does not require a pre-reformer or a desulfurizer which form the fuel cell apparatus 200 by integrating the fuel cell apparatus 200 with the natural gas synthesis apparatus 100. Furthermore, since $CO_2$ discharged by the methanation reactor can be additionally supplied to the cathode electrode, efficiency of the fuel cell module can be improved. In this case, the volumetric ratio of a gas component supplied to the methanation reactor 160 preferably is $H_2$ (0.7%), CO (0.05%), $CO_2$ (21.3%), $CH_4$ (75.9%), $C_2$ (0.05%), and $N_2$ (2.0%).

Second Embodiment

Figure 5:
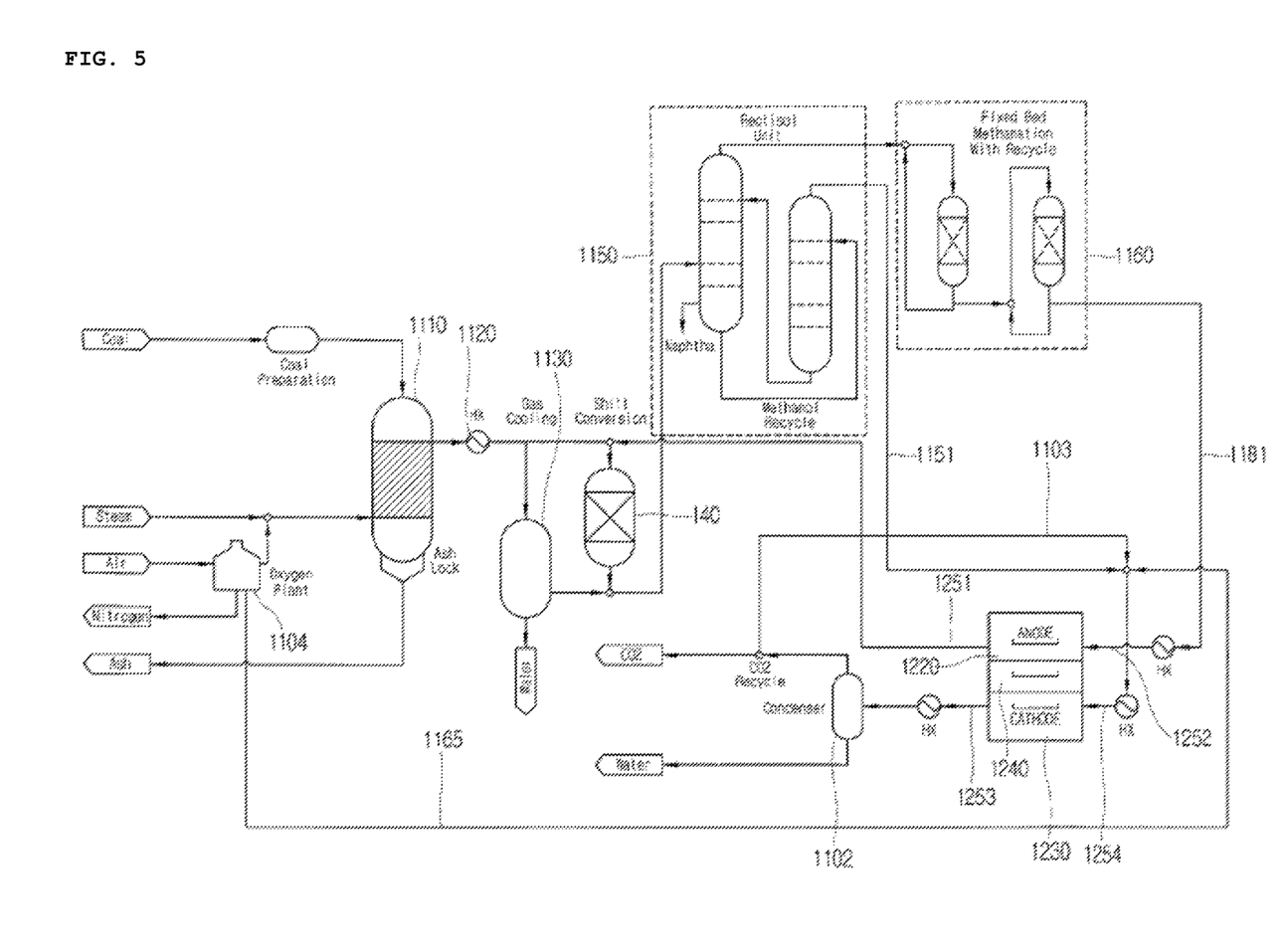

FIG. 5 is a conceptual diagram of a combined power generation system in accordance with a second embodiment of the present invention.

Referring to FIG. 5, a fuel cell apparatus 1200 is connected (a supply line 1181→a supply line 1252) to a natural gas synthesis apparatus 1100 so that it is supplied with hydrogen from the natural gas synthesis apparatus 1100. More specifically, methane generated by a methanation reactor 1160 is supplied to a reformer unit 1210, the reformer unit 1210 forms hydrogen and carbon dioxide through a chemical reaction, and hydrogen generated by the reformer unit 1210 is supplied to the anode electrode 1220 of the fuel cell apparatus 1200.

As described above, hydrogen ($H_2$) is supplied to the anode electrode 1220, and an electrochemical oxidation reaction of hydrogen ($H_2$) and carbonate ions ($CO_3^{2-}$) is generated, thereby generating water, carbon dioxide, and electrons e−.

Carbon dioxide discharged by a second reactor 1150 is supplied to a cathode electrode 1230 through a supply line 1151. Furthermore, oxygen supplied by an oxygen supply unit 1104 is supplied to the cathode electrode 1230 through an oxygen supply line 1105. Furthermore, in order to separate carbon dioxide and water from an exhaust gas discharged by the cathode electrode, a condenser is connected to the cathode electrode. A heat exchanger may be disposed between the condenser and the cathode electrode.

Furthermore, some of the carbon dioxide discharged by the condenser 1102 is separated and supplied to the cathode electrode 1230 through a supply line 1103.

Accordingly, since $CO_2$ can be collected using the fuel cell apparatus without an additional separation task, the performance of the stack unit can be improved due to an increase in the partial pressure of $CO_2$ of the cathode electrode. Accordingly, power production performance efficiency can be increased.

Furthermore, a fluid including unused fuel that is discharged by the anode electrode 1220 through a discharge line 1251 is recirculated and supplied to the first reactor 1140 in an SNG production process. Accordingly, overall efficiency can be improved because a water gas shift reaction is additionally generated.

That is, $H_2$ and CO are unused fuel discharged by the anode electrode 1220, and are supplied to a first reactor 1140 through the discharge line 1251, thereby generating a water gas shift reaction.

Accordingly, overall power production efficiency can be maximized.

In the combined power generation system in accordance with the second embodiment of the present invention, the unused fuel discharged by the anode electrode 1220 is introduced into the first reactor 1140, and $CO_2$ generated through the first reactor 1140 and the second reactor 1150 is introduced into the cathode electrode 1230. Accordingly, pure $CO_2$ and $O_2$ other than $N_2$ are supplied to the stack unit. Furthermore, methane and $H_2$ generated through the methanation reactor 1160 are supplied to the anode electrode 1220 of the stack unit, thereby being capable of improving overall power production efficiency.

Third Embodiment

Figure 6:
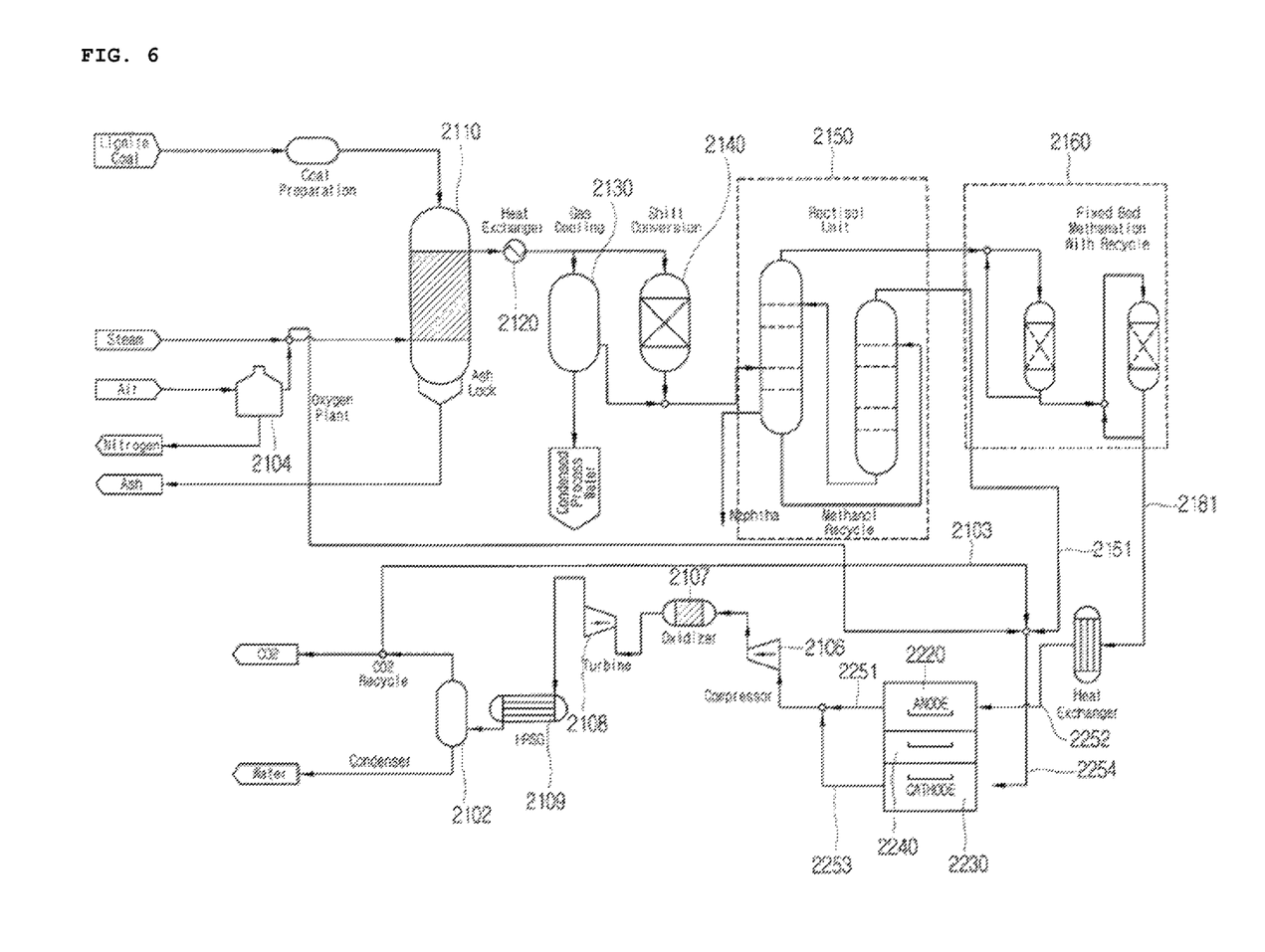

FIG. 6 is a conceptual diagram of a combined power generation system in accordance with a third embodiment of the present invention.

Referring to FIG. 6, a fuel cell apparatus 2200 is connected (a supply line 2181→a supply line 2252) to a natural gas synthesis apparatus 2100 so that it is supplied with hydrogen from the natural gas synthesis apparatus 2100. More specifically, methane generated by a methanation reactor 2160 is supplied to a reformer unit 2210, the reformer unit 2210 forms hydrogen and carbon dioxide through a chemical reaction, and hydrogen generated by the reformer unit 2210 is supplied to the anode electrode 2220 of the fuel cell apparatus 2200.

As described above, hydrogen ($H_2$) is supplied to the anode electrode 2220, and an electrochemical oxidation reaction of hydrogen ($H_2$) and carbonate ions ($CO_3^{2-}$) is generated, thereby generating water, carbon dioxide, and electrons e−.

Carbon dioxide discharged by a second reactor 2150 is supplied to a cathode electrode 2230 through a supply line 2151. Furthermore, oxygen supplied by an oxygen supply unit 2104 is supplied to the cathode electrode 2230 through an oxygen supply line 2105. Furthermore, some of carbon dioxide discharged by a condenser 2102 is separated and supplied to the cathode electrode 2230 through a supply line 2103.

Accordingly, since $CO_2$ can be collected using the fuel cell apparatus without an additional separation task, the performance of the stack unit can be improved due to an increase in the partial pressure of $CO_2$ of the cathode electrode. Accordingly, power production performance efficiency can be increased.

Furthermore, a fluid including unreacted fuel discharged through the discharge lines 2251, 2253 of the anode electrode 2220 and the cathode electrode 2230 is introduced into a compressor 2106. The fluid that has passed through the compressor 2106 passes through an oxidizer 2107, thereby producing power through a turbine 2108.

Gas of a high temperature that has passed through the turbine 2108 is supplied to a condenser 2102 via a heat recovery steam generator 2109. The fluid supplied to the condenser 2102 is condensed and separated into $CO_2$ and $H_2O$. Some of carbon dioxide discharged by the condenser 2102 is separated and supplied to the cathode electrode 2230 through the supply line 2103.

If the fuel cell apparatus 2200 is a first power generation apparatus, the compressor 2106, the oxidizer 2107, and the turbine 2108 become a second power generation apparatus. Furthermore, a fluid recovered by the heat recovery steam generator 2109 may be supplied to a third power generation apparatus (not illustrated) equipped with a steam turbine. Fluid discharged by the anode electrode and the cathode electrode that form the stack unit as described above can produce additional power through the second or third power generation apparatus. Accordingly, efficiency of the entire system can be increased.

Fourth Embodiment

Figure 7:
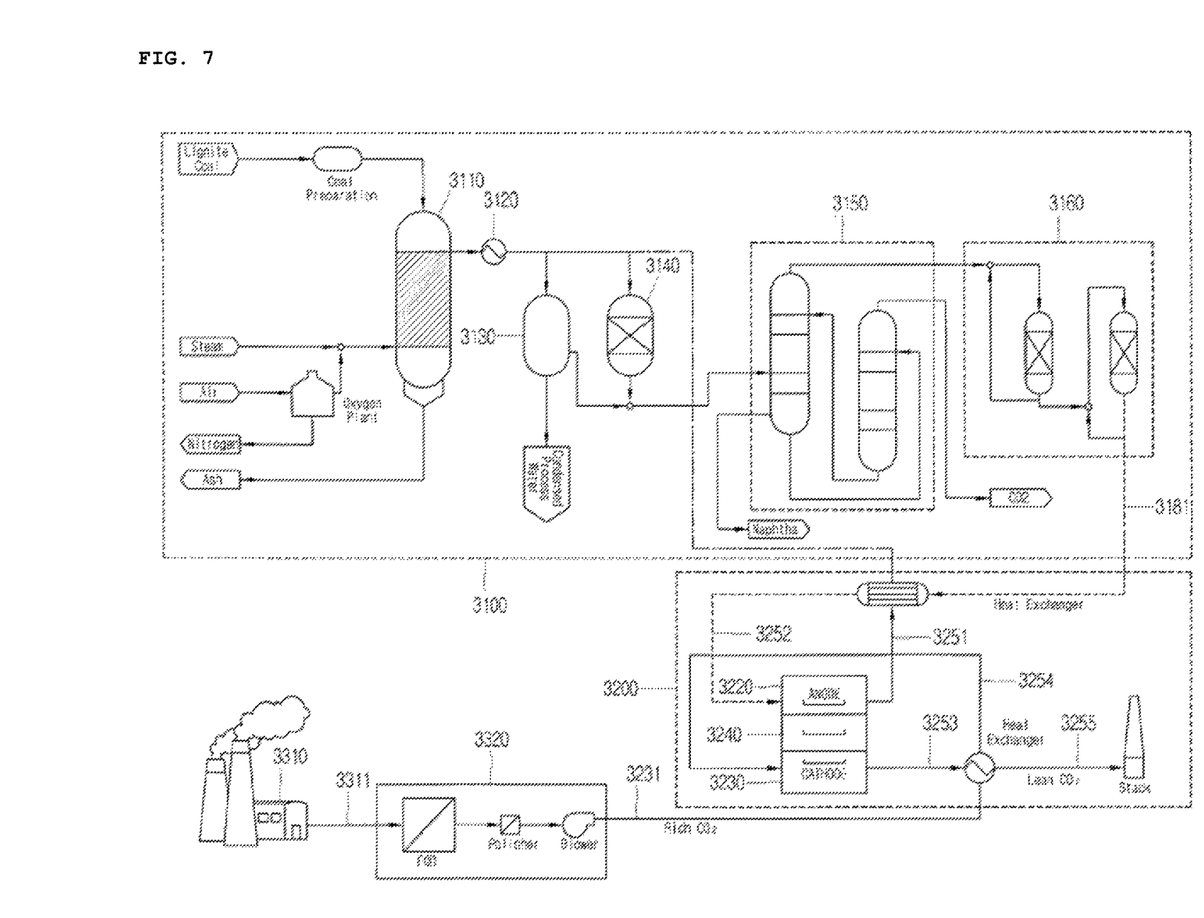

FIG. 7 is a conceptual diagram of a combined power generation system in accordance with a fourth embodiment of the present invention.

Referring to FIG. 7, a fuel cell apparatus 3200 is connected (a supply line 3181→a supply line 3252) to a natural gas synthesis apparatus 3100 so that it is supplied with hydrogen from the natural gas synthesis apparatus 3100. More specifically, methane generated by a methanation reactor 3160 is supplied to a reformer unit 3210, the reformer unit 3210 forms hydrogen and carbon dioxide through a chemical reaction, and hydrogen generated by the reformer unit 3210 is supplied to the anode electrode 3220 of the fuel cell apparatus 3200.

As described above, hydrogen ($H_2$) is supplied to the anode electrode 3220, and an electrochemical oxidation reaction of hydrogen ($H_2$) and carbonate ions ($CO_3^{2-}$) is generated, thereby generating water, carbon dioxide, and electrons e−. In this case, hydrogen and carbon monoxide are also supplied as by-products. The discharge line 3220 of the anode electrode may be connected up to a first reactor 3140 so that the remaining products other than electrons are supplied to the first reactor 3140 in which a water gas shift reaction is generated.

A mixture gas discharged by the anode electrode may include carbon monoxide, hydrogen, carbon dioxide, and $H_2O$. From among them, hydrogen ($H_2$) and carbon monoxide (CO) are unused fuel, and may be supplied to the first reactor 3140 because they may be reused.

As described above, hydrogen ($H_2$) and carbon monoxide (CO), that is, unused fuel, are supplied from the discharge line 3251 of the anode electrode to the first reactor 3140, thereby generating a water gas shift reaction. A reaction equation occurring at this time is as follows.

Accordingly, overall power production efficiency can be maximized.

Furthermore, the fuel cell apparatus 3200 is connected to a carbon dioxide discharge facility 3310, such as a coal thermoelectric power plant, through a carbon dioxide supply unit 3320 and a supply line 3311 so that it is supplied with carbon dioxide from the carbon dioxide discharge facility 3310. Since the exhaust gas of the carbon dioxide discharge facility 3310 includes unnecessary sulfur, the carbon dioxide supply unit 3320 may include a desulfurization apparatus. Furthermore, since the exhaust gas of the carbon dioxide discharge facility 3310 has low pressure, the carbon dioxide supply unit 3320 may further include a pressurization apparatus for pressurizing carbon dioxide at a specific pressure or higher and supplying the pressurized carbon dioxide to a cathode electrode 3230.

As described above, according to the present invention, $CO_2$ can be collected without an additional collection apparatus in the stack unit because the carbon dioxide discharged by the carbon dioxide discharge facility 3310 is supplied to the cathode electrode 3230 of the fuel cell apparatus 3200 through a supply line 3321. Accordingly, the power generation performance of the stack unit can be improved because the partial pressure of $CO_2$ in the cathode electrode 3230 of the stack unit is increased, and thus power production performance efficiency can be improved.

Furthermore, a fluid including unused fuel discharged by the stack unit is recirculated into the first reactor 3140 in an SNG production process. Accordingly, overall efficiency can be improved because a water gas shift reaction is additionally generated.

A method of collecting carbon dioxide in the combined power generation system according to the present invention includes the following steps. In a first step, the carbon dioxide discharged by the carbon dioxide discharge facility 3310, such as a coal thermoelectric power plant, is subject to desulfurization processing, pressurized, and then supplied to the cathode electrode 3230 of the fuel cell.

In a second step, the carbon dioxide supplied to the cathode electrode 3230 is converted into carbonate ions ($CO_3^{2-}$), condensed through the anode electrode 3220, and discharged as carbon dioxide again through the anode electrode 3220.

In a third step, the carbon dioxide discharged by the anode electrode 3220 passes through the first reactor 3140 and the second reactor 3150 of the natural gas synthesis apparatus. The carbon dioxide that has passed through the second reactor 3150 is separately separated, compressed, and buried in a repository.

Through such a process, the combined power generation system in accordance with an embodiment of the present invention can collect carbon dioxide, discharged by the carbon dioxide discharge facility 3310, to a maximum of 90%.

In the combined power generation system in accordance with the fourth embodiment of the present invention, the carbon dioxide discharge facility 3310, the fuel cell apparatus 3200, and the natural gas synthesis apparatus 3100 are associated. That is, a coal thermoelectric power plant, that is, one of the carbon dioxide discharge facilities 3310, discharges carbon dioxide while producing electrical energy using coal, that is, a main raw material. Furthermore, the natural gas synthesis apparatus 3100 generates methane using organic compounds. Furthermore, the fuel cell apparatus 3200 produces electrical energy using hydrogen generated from methane and carbon dioxide discharged by the carbon dioxide discharge facility 3310, and condenses and collects carbon dioxide.

Fifth Embodiment

Figure 8:
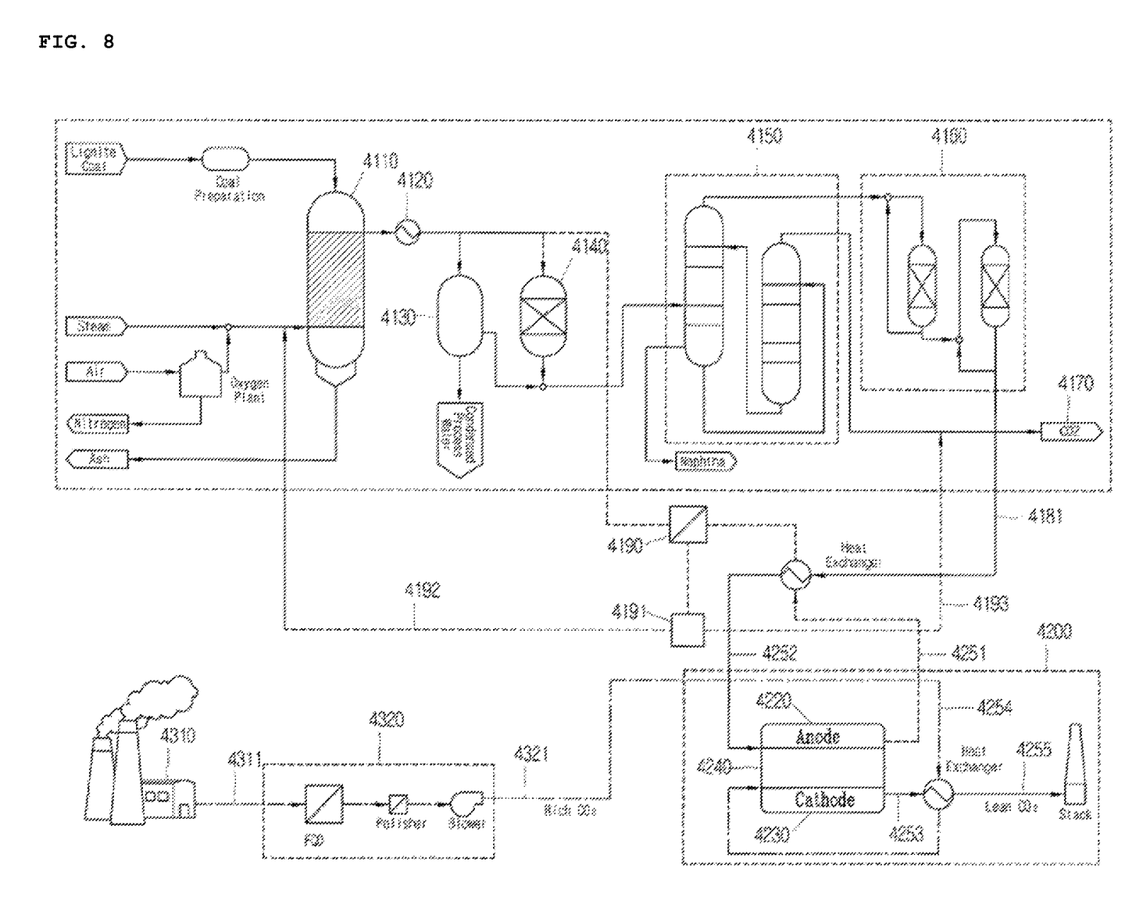
Figure 9:
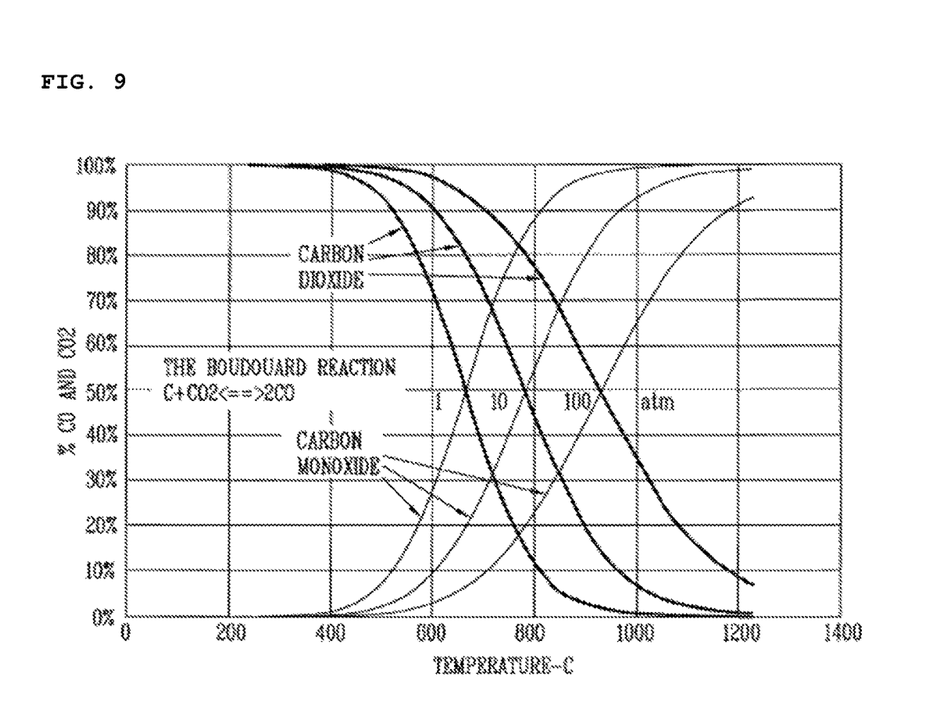
FIG. 9 is a graph illustrating a conversion ratio according to a Boudouard reaction between carbon dioxide and carbon monoxide according to temperature C and pressure atm.

FIG. 8 is a conceptual diagram of a combined power generation system in accordance with a fifth embodiment of the present invention, and FIG. 9 is a graph illustrating a conversion ratio according to a Boudouard reaction between carbon dioxide and carbon monoxide according to temperature C and pressure atm.

Referring to FIG. 8, a fuel cell apparatus 4200 is connected (a supply line 4181→a supply line 4252) to a natural gas synthesis apparatus 4100 so that it is supplied with hydrogen from the natural gas synthesis apparatus 4100. More specifically, methane generated by a methanation reactor 4160 is supplied to a reformer unit 4210, the reformer unit 4210 forms hydrogen and carbon dioxide through a chemical reaction, and hydrogen generated by the reformer unit 4210 is supplied to the anode electrode 4220 of the fuel cell apparatus 4200.

As described above, hydrogen ($H_2$) is supplied to the anode electrode 4220, and an electrochemical oxidation reaction of hydrogen ($H_2$) and carbonate ions ($CO_3^{2-}$) is generated, thereby generating water, carbon dioxide, and electrons e–. In this case, hydrogen, $CH_4$, $H_2O$, and carbon monoxide unreacted in the cathode electrode are also supplied. The discharge line 4251 of the anode electrode may be connected up to a first reactor 4140 so that the remaining products other than electrons are supplied to the first reactor 4140 in which a water gas shift reaction is generated.

A separation membrane apparatus 4190 is formed at any one point on the discharge line 4251 of the anode electrode.

A mixture gas discharged by the anode electrode 4220 may include carbon monoxide, hydrogen, carbon dioxide, $H_2O$, etc. From among them, hydrogen ($H_2$) and carbon monoxide (CO) are unused fuel, and may be supplied to the first reactor 4140 because they may be reused. If even the carbon dioxide is supplied to the first reactor 4140, however, the capacity of a second reactor 4150 for collecting the carbon dioxide needs to be increased. If the capacity of the second reactor 4150 is increased, efficiency of the entire system is reduced, and a coast is increased.

In order to solve such problems, the separation membrane apparatus 4190 is configured to separate hydrogen and carbon dioxide included in the mixture gas discharged by the anode electrode 4220. A polymeric membrane, an inorganic membrane, a carbon membrane, a Zeolite membrane, or a facilitated transport membrane may be used as a separation membrane that forms the separation membrane apparatus 4190.

Hydrogen ($H_2$) and carbon monoxide (CO), that is, unused fuel that belongs to the mixture gas discharged by the discharge line 4251 of the anode electrode and that has been separated by the separation membrane apparatus 4190, are supplied to the first reactor 4140. When the fuel is supplied, a water gas shift reaction is generated within the first reactor 4140. A reaction equation occurring at this time is as follows.

Accordingly, overall power production efficiency can be maximized.

Furthermore, some of the carbon dioxide separated by the separation membrane apparatus 4190 is supplied to the gasifier 4110 through a supply line 4192. The carbon dioxide supplied to the gasifier 4110 is a kind of gas transport gas, and may be used as the alternative of nitrogen supplied to the gasifier 4110. Accordingly, the amount of air supplied to the gasifier 4110 can be reduced, and power consumption related to the supply of air can also be reduced. Furthermore, since the carbon dioxide is subject to a conversion reaction with carbon monoxide through a reaction with carbon, efficiency can be improved because fuel is additionally generated. A collection ratio of carbon dioxide can be increased because such carbon dioxide is collected again through the second reactor 4150.

Efficiency can be improved because carbon dioxide is supplied to the gasifier 4110, and a reaction thereof is as follows.

Some of the carbon dioxide separated by the separation membrane apparatus 4190 moves through a supply line 4193, and may be collected and stored in a carbon dioxide repository 4170 along with the carbon dioxide discharged through the second reactor 4150. A separate apparatus for increasing the concentration of carbon dioxide is not required because the carbon dioxide separated by the separation membrane apparatus 4190 has high purity.

A valve 4191 is formed between the supply lines 4192 and 4193 so that carbon dioxide is divided and supplied.

The capacity of the second reactor 4150 can be reduced because carbon dioxide is separated from the mixture gas, discharged by the anode electrode 4220, through the separation membrane apparatus 4190 as described above. Furthermore, power consumption of the entire system can be reduced because the amount of air supplied to the gasifier 4110 is reduced. Furthermore, efficiency can be improved through the reuse of carbon dioxide because CO, that is, a raw material, is generated through a Boudouard reaction as illustrated in FIG. 5. That is, energy efficiency of the entire system and a collection ratio of carbon dioxide can be improved by the separation membrane apparatus 4190.

Furthermore, the fuel cell apparatus 4200 is connected to a carbon dioxide discharge facility 4310 through a carbon dioxide supply unit 4320 and a supply line 4311 so that it is supplied with carbon dioxide from the carbon dioxide discharge facility 4310. Since the exhaust gas of the carbon dioxide discharge facility 4310 includes unnecessary sulfur, the carbon dioxide supply unit 4320 may include a desulfurization apparatus. Furthermore, since the exhaust gas of the carbon dioxide discharge facility 4310 has low pressure, the carbon dioxide supply unit 4320 may further include a pressurization apparatus for pressurizing carbon dioxide at a specific pressure or higher and supplying the pressurized carbon dioxide to a cathode electrode 4230.

As described above, according to the present invention, $CO_2$ can be collected without an additional collection apparatus in the stack unit because the carbon dioxide discharged by the carbon dioxide discharge facility 4310 is supplied to the cathode electrode 4230 of the fuel cell apparatus 4200 through a supply line 4321.

Furthermore, a fluid including unused fuel discharged by the stack unit is recirculated into the first reactor 4140 in an SNG production process. Accordingly, overall efficiency can be improved because a water gas shift reaction is additionally generated.

A method of collecting carbon dioxide in the combined power generation system in accordance with the fifth embodiment of the present invention includes the following steps. In a first step, the carbon dioxide discharged by the carbon dioxide discharge facility 4310, such as a coal thermoelectric power plant, is subject to desulfurization processing, pressurized, and then supplied to the cathode electrode 4230 of the fuel cell.

In a second step, the carbon dioxide supplied to the cathode electrode 4230 is converted into carbonate ions ($CO_3^{2-}$), condensed through the anode electrode 4220, and discharged as carbon dioxide again through the anode electrode 4220.

In a third step, the carbon dioxide discharged by the anode electrode 4220 is separated by the separation membrane apparatus 4190, and some of the separated carbon dioxide is supplied to the gasifier 4110. The remainder of the separated carbon dioxide is separately separated and compressed along with carbon dioxide that has passed through the second reactor 4150, and is then buried in the carbon dioxide repository. Furthermore, the carbon dioxide introduced into the gasifier 4110 passes through the first reactor 4140 and the second reactor 4150.

Through such a process, the combined power generation system in accordance with an embodiment of the present invention can collect carbon dioxide, discharged by the carbon dioxide discharge facility 4310, to a maximum of 90%.

Furthermore, the capacity of the second reactor 4150 can be reduced because carbon dioxide is separated from the mixture gas, discharged by the anode electrode, through the separation membrane apparatus 4190. Furthermore, power consumption of the entire system can be reduced because the amount of air supplied to the gasifier 4110 is reduced. Furthermore, efficiency can be improved through the reuse of carbon dioxide because CO, that is, a raw material, is generated through a Boudouard reaction. That is, energy efficiency of the entire combined power generation system and a collection ratio of carbon dioxide can be improved by the separation membrane apparatus 4190.

In the combined power generation system in accordance with the fifth embodiment of the present invention, the carbon dioxide discharge facility 4310, the fuel cell apparatus 4200, and the natural gas synthesis apparatus 4100 are associated. That is, the coal thermoelectric power plant discharges carbon dioxide while producing electrical energy using coal, that is, a main raw material. Furthermore, the natural gas synthesis apparatus 4100 generates methane using organic compounds. Furthermore, the fuel cell apparatus 4200 produces electrical energy using hydrogen generated from methane and carbon dioxide discharged by the carbon dioxide discharge facility 4310, and condenses and collects carbon dioxide.

The aforementioned combined power generation system and method of collecting carbon dioxide in the combined power generation system are not limitedly applied to the configurations and methods of the aforementioned embodiments, and all of or some of the embodiments may be selectively combined and configured so that the embodiments are modified in various ways.

INDUSTRIAL APPLICABILITY

The embodiments of the present invention may be applied to a combined power generation system complexly equipped with a natural gas synthesis apparatus and a fuel cell apparatus.

The invention claimed is:

1. A power generation system, comprising:
a natural gas synthesis apparatus comprising a gasifier which generates a synthetic gas from coal and oxygen and a methanation reactor which synthesizes methane using the synthetic gas;
a fuel cell apparatus comprising a cathode electrode, an anode electrode, and a reformer unit;
a first reactor which generates hydrogen and carbon dioxide through a water gas shift reaction from a fluid comprising hydrogen and carbon monoxide discharged by the gasifier and supplied directly to the first reactor; and a second reactor which separates carbon dioxide and sulfur compounds from a fluid that comprises hydrogen and carbon dioxide and that is directly supplied to the second reactor by the first reactor, through physical or chemical segregation;

a carbon dioxide supply unit which supplies the cathode electrode of the fuel cell apparatus with carbon dioxide discharged by a carbon dioxide discharge facility; and a separation membrane apparatus which separates hydrogen from a fluid that is discharged by the anode electrode, wherein the separation membrane apparatus supplies the separated hydrogen to the first reactor via a fluid connection, wherein fuel comprising the methane generated by the methanation reactor is supplied to the reformer unit, wherein a fluid connection is provided between the anode electrode and the first reactor, which supplies the fluid that is discharged by the anode electrode to the first reactor, the fluid comprising hydrogen and carbon monoxide, wherein the separation membrane apparatus is configured to separate at least some of the carbon dioxide included in fluid discharged by the anode electrode and supply the separated carbon dioxide to the gasifier via a fluid connection, and wherein the carbon dioxide discharged by the carbon dioxide discharge facility is supplied to the cathode electrode of the fuel cell apparatus via a heat exchanger in which the carbon dioxide discharged by the carbon dioxide discharge facility exchanges heat with a fluid discharged by the cathode electrode.

2. The power generation system of claim 1, wherein a fluid connection is provided between the second reactor and the cathode electrode which supplies carbon dioxide separated by the second reactor to the cathode electrode.

3. The power generation system of claim 1, wherein the reformer unit is supplied with the fluid that comprises the hydrogen and the carbon monoxide from the methanation reactor, wherein the methanation reactor accepts said fluid from the first reactor and the second reactor and converts said fluid into methane.

4. The power generation system of claim 1, wherein:
the natural gas synthesis apparatus further comprises an oxygen supply unit which supplies oxygen to the gasifier via a fluid connection, and wherein further the oxygen supply unit supplies at least some oxygen to the cathode electrode.

5. The power generation system of claim 1, further comprising a condenser which separates water and carbon dioxide included in fluid discharged by the cathode electrode,
wherein the cathode electrode accepts via a fluid connection carbon dioxide separated by the condenser.

6. The power generation system of claim 1, further comprising a power generation apparatus which produces electrical energy using a fluid discharged by the fuel cell apparatus,
wherein the power generation apparatus comprises a compressor which compresses the fluid discharged by the fuel cell apparatus, an oxidizer which oxidizes the fluid passing through the compressor, and a turbine which generates power using gas discharged by the oxidizer.

7. The power generation system of claim 6, further comprising a heat recovery steam generator connected to the turbine, the heat recovery steam generator absorbing exhaust heat of the gas discharged by the turbine.

8. The power generation system of claim 1, wherein the fluid connection provided between the anode electrode and the first reactor is a direct fluid connection.

9. The power generation system of claim 1, wherein the carbon dioxide discharge facility includes a coal thermoelectric power plant connected to the carbon dioxide supply unit through a supply line.

10. The power generation system of claim 9, wherein the carbon dioxide supply unit comprises:
a desulfurization apparatus which is connected to the supply line and removes sulfur from an exhaust gas discharged by the carbon dioxide discharge facility, and
a pressurization apparatus which pressurizes an exhaust gas comprising carbon dioxide, and supplies the pressurized gas to the cathode electrode.

* * * * *